(12) United States Patent
Shon et al.

(10) Patent No.: US 9,748,597 B2
(45) Date of Patent: Aug. 29, 2017

(54) FLEXIBLE ELECTRODE ASSEMBLY AND ELECTROCHEMICAL DEVICE INCLUDING THE ELECTRODE ASSEMBLY

(71) Applicant: Samsung Electronics Co., Ltd., Suwon-si, Gyeonggi-do (KR)

(72) Inventors: Jeongkuk Shon, Hwaseong-si (KR); Junhwan Ku, Seongnam-si (KR); Sangmin Ji, Suwon-si (KR); Minsang Song, Seongnam-si (KR); Moonseok Kwon, Hwaseong-si (KR); Jaeman Choi, Hwaseong-si (KR); Seungsik Hwang, Seongnam-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 149 days.

(21) Appl. No.: 14/626,453

(22) Filed: Feb. 19, 2015

(65) Prior Publication Data

US 2016/0079625 A1  Mar. 17, 2016

(30) Foreign Application Priority Data

Sep. 15, 2014 (KR) .................. 10-2014-0122036

(51) Int. Cl.
*H01M 10/04* (2006.01)

(52) U.S. Cl.
CPC .... *H01M 10/0436* (2013.01); *H01M 2220/30* (2013.01)

(58) Field of Classification Search
CPC ................ H01M 10/0436; H01M 2220/30
See application file for complete search history.

(56) References Cited

U.S. PATENT DOCUMENTS

| 2008/0199781 A1* | 8/2008 | Lunt | H01M 2/1646 |
| | | | 429/246 |
| 2012/0156527 A1 | 6/2012 | Kataoka | |
| 2013/0288110 A1* | 10/2013 | Schaefer | H01M 2/00 |
| | | | 429/186 |
| 2014/0162104 A1* | 6/2014 | Lex | H02J 1/10 |
| | | | 429/101 |

FOREIGN PATENT DOCUMENTS

| JP | 2008-282735 A | 11/2008 |
| JP | 4310010 B2 | 5/2009 |
| JP | 2010-157417 A | 7/2010 |
| KR | 2003-0005246 A | 1/2003 |
| KR | 10-0528898 B1 | 11/2005 |
| KR | 10-0936411 B1 | 1/2010 |
| KR | 10-1025187 B1 | 3/2011 |
| KR | 10-1100990 B1 | 12/2011 |
| KR | 1020120124081 A | 11/2012 |

* cited by examiner

*Primary Examiner* — Jane Rhee
(74) *Attorney, Agent, or Firm* — Cantor Colburn LLP

(57) ABSTRACT

An electrode assembly including an electrode structure including a first electrode plate and a second electrode plate which are alternately disposed, and a separator film that is disposed between the first electrode plate and the second electrode plate, wherein a surface of the separator film is bonded to the first electrode plate, and a binding member, which rigidly connects at least one selected from the first electrode plate, the second electrode plate, and the separator film.

20 Claims, 10 Drawing Sheets

FLEXIBLE ELECTRODE ASSEMBLY AND ELECTROCHEMICAL DEVICE INCLUDING THE ELECTRODE ASSEMBLY

CROSS REFERENCE TO RELATED APPLICATIONS

This application claims priority to and the benefit of Korean Patent Application No. 10-2014-0122036, filed on Sep. 15, 2014, in the Korean Intellectual Property Office, and all the benefits accruing therefrom under 35 U.S.C. §119, the content of which is incorporated herein in its entirety by reference.

BACKGROUND

1. Field

Disclosed are a flexible electrode assembly and an electrochemical device including the flexible electrode assembly.

2. Description of the Related Art

Due to the development of electronic technology, markets for various mobile electronic devices, such as smartphones, smart pads, electronic book terminals, tablet computers, or body-attachable mobile medical devices, as well as mobile phones, devices for game, portable multimedia players ("PMP"), and MP3 (mpeg audio layer-3) players, have been substantially expanding. The expanded markets for mobile electronic device have led to high demands for batteries that are suitable for driving mobile electronic devices, and when use and transportation, preservation, and impact-durability of these mobile electronic devices are taken into consideration, there is a need for flexible devices. To provide highly-flexible devices, flexible batteries are also increasingly desired.

Secondary, i.e., rechargeable, batteries, in particular, lithium secondary batteries, which provide higher voltages and higher energy densities per unit weight than nickel-cadmium batteries or nickel-hydrogen batteries, are desirable. However, when batteries that lack flexibility are bent, durability and stability of the batteries may decrease. Thus there remains a need for an improved flexible secondary battery.

SUMMARY

Provided are a flexible electrode assembly and an electrochemical device including the flexible electrode assembly.

Additional aspects will be set forth in part in the description which follows and, in part, will be apparent from the description.

An aspect provides an electrode structure including a first electrode plate and a second electrode plate which are alternately disposed, and a separator film that is disposed between the first electrode plate and the second electrode plate, wherein a surface of the separator film is bonded to the first electrode plate; and a binding member, which rigidly connects at least one selected from the first electrode plate, the second electrode plate, and the separator film.

The first and second electrode plates may be flexible. Each of the first and second electrode plates may include an electrode current collector and an electrode active material layer disposed on at least a surface of the electrode current collector.

The first electrode plate may be a cathode plate, and the second electrode plate may be an anode plate.

The first electrode plate may be an anode plate, and the second electrode plate may be a cathode plate.

The first electrode plate may be bonded to the separator film by an adhesive layer or may be directly bonded. At least a portion of a surface of the separator film, which is bonded to the first electrode plate, has a bonding area.

When the electrode assembly is bent and deformed, layers constituting the electrode structure may experience less relative-location changes where slippage occurs in a portion of the electrode structure that is bound to the binding member than a portion of the electrode structure that is not bound to the binding member.

The binding member may bind an end of the electrode structure. The binding member may bind the second electrode plate and at least one selected from the first electrode plate and the separator film.

The binding member may include a first binding member binding an end of the electrode structure and a second binding member binding the other end of the electrode structure. The first binding member may bind at least one selected from the first electrode plate and the separator film, and the second binding member may bind the second electrode plate.

The binding member may bind a central portion of the electrode structure.

A protective layer may be disposed on an outer surface of the electrode structure. A bending stiffness of the protective layer may be greater than an average bending stiffness of each of the first and second electrode plates and the separator film, which may constitute the electrode structure.

Another aspect provides an electrochemical device including: an electrode assembly, wherein the electrode assembly includes an electrode structure including a first electrode plate and a second electrode plate which are alternately disposed, a separator film that is disposed between the first electrode plate and the second electrode plate, and a binding member which rigidly connects a portion of at least one selected from the first electrode plate, the second electrode plate, and the separator film, wherein a surface of the separator film is bonded to the first electrode plate; and an electrolyte disposed in the electrode structure.

The binding member may bind an end, opposite ends, or a central portion of the electrode structure. At least a portion of a surface of the separator film, which is bonded to the first electrode plate, has a bonding area.

Also disclosed is a method of manufacturing an electrode assembly, the method including: disposing a separator film between a first electrode plate and a second electrode plate; and rigidly connecting at least one selected from the first electrode plate, the second electrode plate, and the separator film to manufacture the electrode assembly.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
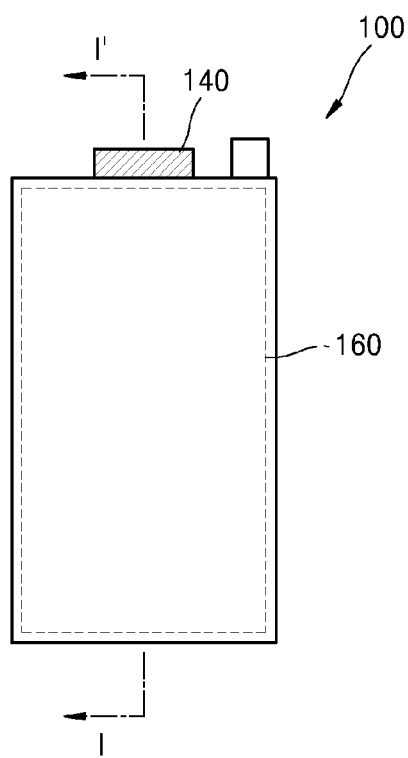
FIG. 1 is a plan view of an embodiment of an electrode assembly.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects.

Hereinafter, embodiments will be described in detail in connection with the accompanying drawings. In the drawings, like reference numerals denote like elements, and the sizes or thicknesses of constituting elements may be exaggerated for clarity. It will also be understood that when a material layer is referred to as being "on" a substrate or another layer, it can be directly on the substrate or the other layer or substrate, or intervening layers may also be present. In contrast, when an element is referred to as being "directly on" another element, there are no intervening elements present. Also, in the following embodiments, a material that may constitute each layer is provided only as an example, and another suitable material may instead if desired.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
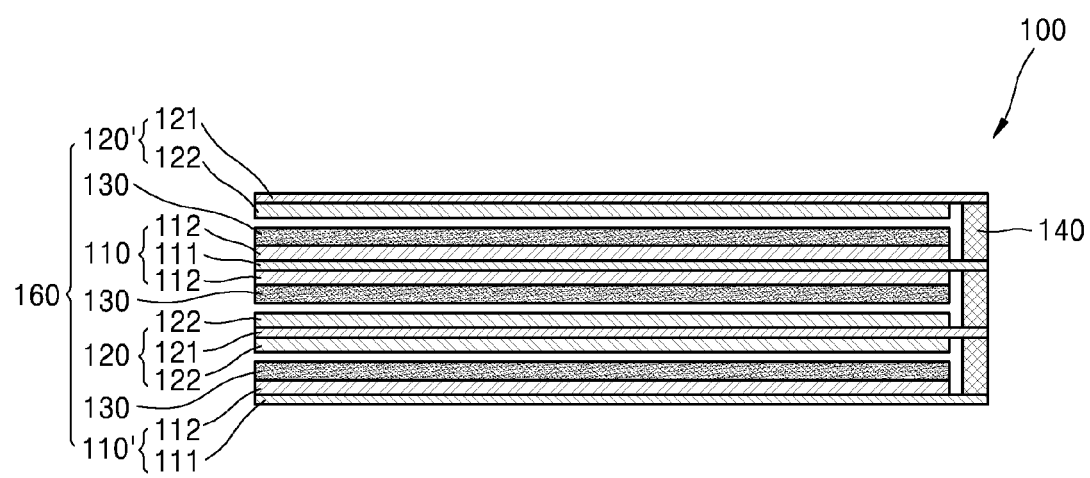
FIG. 2 is a cross-sectional view taken along line I-I' of FIG. 1.

FIG. 1 is a plan view of an embodiment of an electrode assembly 100. FIG. 2 is a cross-sectional view taken along line I-I' of FIG. 1.

Referring to FIGS. 1 and 2, the electrode assembly 100 includes an electrode structure 160 and a binding member 140 that binds, e.g., rigidly connects, an end of the electrode structure 160. At the rigid connection, a location or position of the bound element remains constant even if the electrode assembly 100 is deformed. The electrode structure 160 includes a stacked structure including a first inner electrode plate 110 and first outer electrode plates 110', hereinafter collectively "first electrode plates," a separator film 130, and a second inner electrode plate 120 and second outer electrode plate 120', hereinafter collectively "second electrode plates,". In detail, the electrode structure 160 includes a plurality of first electrode plates 110 and 110' and a plurality of second electrode plates 120 and 120', which are alternately disposed, e.g., stacked, and a plurality of separator films 130 disposed between the first electrode plates 110 and 110' and the second electrode plates 120 and 120'. Herein, the separator films 130 are bonded, e.g., adhered to or directly bonded to, as is further described later, to the first electrode plates 110 and 110'. The first electrode plates 110 and 110', the second electrode plates 120 and 120', and the separator films 130 may each include a sheet comprising a flexible material, and accordingly, the electrode structure 160 may be flexible, e.g., have a Young's modulus (i.e., a tensile modulus) of about 0.001 to about 5 gigaPascals (GPa), or about 0.01 to about 1 GPa, or about 0.05 to about 0.5 GPa. Each of the first electrode plates 110 and 110', the second electrode plates 120 and 120', and the separator films 130 may each independently have a Young's modulus of about 0.001 to about 5 GPa, or about 0.01 to about 1 GPa, or about 0.05 to about 0.5 GPa.

Any one of a first electrode plate and a second electrode plate may be a cathode plate, and the other electrode plate may be an anode plate. In some embodiments, when the first electrode plates 110 and 110' may each be a cathode plate, the second electrode plates 120 and 120' may each be an anode plate. In some embodiments, when the first electrode plates 110 and 110' may each be an anode plate, the second electrode plates 120 and 120' may each be a cathode plate.

Each of the first electrode plates 110 and 110' may include a first electrode current collector 111 and a first electrode active material layer 112 disposed on, e.g., formed on, a surface of the first electrode current collector 111. Herein, in the first inner electrode plate 110, which is disposed in an inner portion of the electrode structure 160, the first electrode active material layer 112 is disposed on, e.g., formed on, both surfaces of the first inner electrode current collector 111, and in first outer electrode plate 110', which is disposed in an outer portion of the electrode structure 160, the first electrode active material layer 112 may be disposed on, e.g., formed on, only one surface of the first inner electrode current collector 111. Each of the second electrode plates 120 and 120' may include a second electrode current collector 121 and a second electrode active material layer 122 disposed on, e.g., formed on, a surface of the second electrode current collector 121. Herein, in the second inner electrode plate 120 located in the inner portion of the electrode structure 160, the second electrode active material layer 122 is disposed on, e.g., formed on, both surfaces of the second outer electrode current collector 121, and in the second outer electrode plate 120', which is disposed in the outer portion of the electrode structure 160, the second electrode active material layer 122 may be disposed on, e.g., formed on, only one surface of the second electrode current collector 121.

When the first electrode plates 110 and 110' are a cathode plate and the second electrode plates 120 and 120' are an anode plate, the first electrode current collector 111 may be a cathode current collector and the first electrode active material layer 112 may be a cathode active material layer. In this case, the second electrode current collector 121 may be an anode current collector and the second electrode active material layer 122 may be an anode active material layer.

The cathode current collector may comprise, for example, at least one metal selected from aluminum, stainless steel, titanium, copper, and silver. The cathode active material layer may include a cathode active material, a binder, and a conductive agent. In a lithium battery, the cathode active material layer may include a material that reversibly enables occlusion and release of lithium ions.

The cathode active material may include, for example, at least one material selected from a lithium transition metal oxide, such as at least one selected from lithium cobalt oxide, lithium nickel oxide, lithium nickel cobalt oxide, lithium nickel cobalt aluminum oxide, lithium nickel cobalt manganese oxide, lithium manganese oxide, and lithium iron phosphate; nickel sulfide, copper sulfide, sulfur, iron oxide, and vanadium oxide. A combination comprising at least one of the foregoing may be used.

The binder may include, for example, at least one material selected from a polyvinylidenefluoride-based binder, such as polyvinylidenefluoride, a vinylidene fluoride/hexafluoropropylene copolymer, or a vinylidenefluoride/tetrafluoroethylene copolymer; a carboxymethylcellulose-based binder, such as sodium-carboxymethylcellulose, or lithium-carboxymethylcellulose; an acrylate-based binder, such as polyacrylic acid, lithium-polyacrylic acid, acryl, polyacrylonitrile, polymethylmethacrylate, or polybutylacrylate; polyamideimide, polytetrafluoroethylene, polyethyleneoxide, polypyrrole, lithium salt of a sulfonated tetrafluoroethylene based fluoropolymer-copolymer, e.g., Nafion®, e.g., lithium tetrafluoroethylene-perfluoro-3,6-dioxa-4-methyl-7-octanesulfonic acid copolymer, a styrene butadiene rubber-based polymer.

The conductive agent may include, for example, at least one material selected from a carbonaceous conductive agent, such as carbon black, carbon fiber, and graphite; a conductive fiber, such as metal fiber; a metal powder, such as carbon fluoride powder, aluminum powder, and nickel powder; a conductive whisker, such as zinc oxide and potassium titanate; a conductive metal oxide, such as a titanium oxide; and a conductive polymer, such as a polyphenylene derivative.

The anode current collector may include, for example, at least one material selected from copper, stainless steel, nickel, aluminum, and titanium. The anode active material layer may include an anode active material, a binder, and a conductive agent. An anode active material layer in a liquid secondary battery may comprise a material that is alloyable with lithium, or a material that reversibly enables occlusion and release of lithium.

The anode active material may include, for example, at least one material selected from a metal, a carbonaceous material, metal oxide, and lithium metal nitride. The metal may include at least one material selected from lithium, silicone, magnesium, calcium, aluminum, germanium, tin, lead, arsenic, antimonium, bismuth, silver, gold, zinc, cadmium, mercury, copper, iron, nickel, cobalt, and indium. The carbonaceous material may include at least one material selected from graphite, graphite carbon fiber, cork, mesocarbon microbeads ("MCMB"), polyacene, pitch-based carbon fiber, and hard carbon. The metal oxide may include at least one material selected from lithium titanium oxide, titanium oxide, molybdenum oxide, niobium oxide, iron oxide, tungsten oxide, tin oxide, amorphous tin composite oxide, silicon monooxide, cobalt oxide, and nickel oxide. A binder and a conductive agent, which are used in an anode active material layer, may be the same as the binder and the conductive agent which are used in the cathode active material layer.

The separator film 130 is disposed between the first electrode plates 110 and 110' and the second electrode plates 120 and 120'. The separator film 130 may electrically separate the first electrode plates 110 and 110' from the second electrode plates 120 and 120'. The separator film 130 may include, for example, a porous polymer film, such as a polyethylene film or a polypropylene film; a woven fabric or non-woven fabric, such as a polymer fiber; ceramic particles; or a polymer solid electrolyte.

A surface of the separator film 130 may be bonded to, e.g., adhered to or directly bonded to, the respective adjacent first electrode plate, e.g., first electrode plates 110 and 110' (for example, the first electrode active material layer 112). In detail, a surface of the separator film 130 may be bonded to facing surfaces of the first inner electrode plate 110 located in the inner portion of the electrode structure 160, and a surface of the separator film 130 may bonded to a surface of the first outer electrode plate 110', which is disposed in the outer portion of the electrode structure. However, the disclosed embodiments are not limited thereto.

The bonding of the separator film 130 and the first electrode plates 110 and 110' may be performed such that an adhesive layer (not shown) is disposed on, e.g., formed on, a surface of the separator film 130, and then, the first electrode plates 110 and 110' are bonded to the surface of the separator film 130 with the adhesive layer thereon using a bonding device. In some embodiments, the bonding of the separator film 130 and the first electrode plates 110 and 110' may be performed by direct bonding instead of the use of the adhesive layer, for example, by heat-welding.

The surface of the separator film 130 may have a bonding area where the first electrode plates 110 and 110' are actually bonded to, e.g., are directly bonded to or are integrated with, the separator film 130. The bonding area may occupy the entire surface or a portion of the surface of the separator film 130. FIGS. 3A to 3F exemplarily show the bonding area of the surface of the separator film 130 of the electrode assembly 100 illustrated in FIGS. 1 and 2.

Figure 3A:
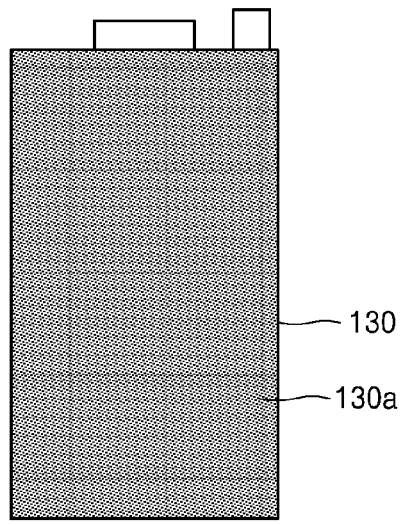
FIGS. 3A to 3F illustrate examples of a bonding area on a surface of a separator film in the electrode assembly illustrated in FIGS. 1 and 2.
Figure 3B:
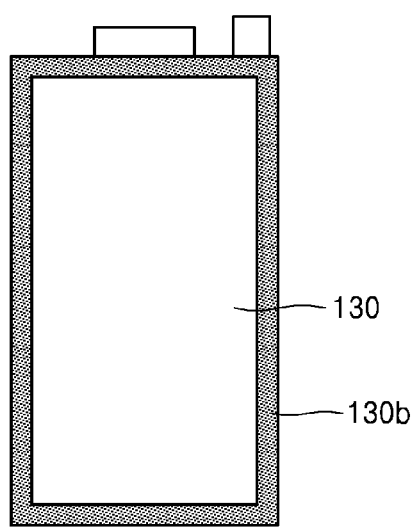
Figure 3C:
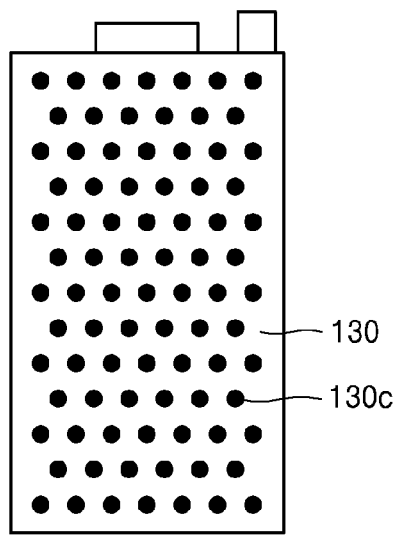
Figure 3D:
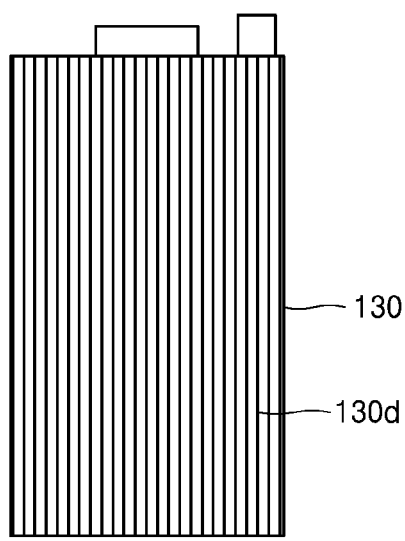
Figure 3E:
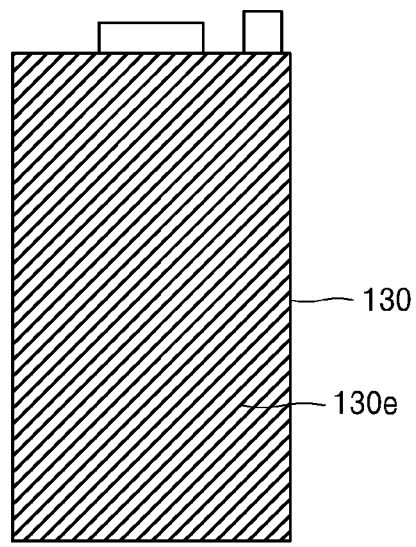
Figure 3F:
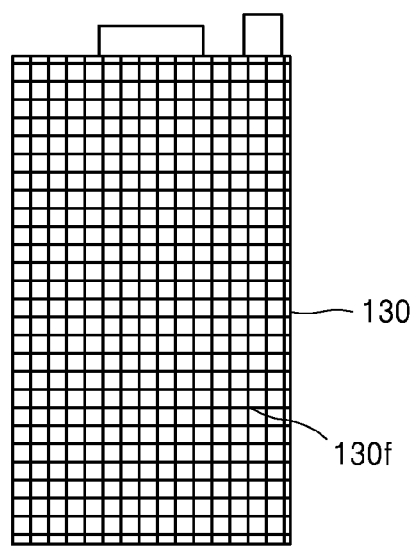

FIG. 3A shows a bonding area 130a formed on the entire surface of the separator film 130. FIG. 3B shows a bonding area 130b formed on an edge of the surface of the separator film 130, and FIG. 3C shows a bonding area 130c formed in a dot pattern on the surface of the separator film 130. FIG. 3D shows a bonding area 130d formed in a vertical stripe pattern on the surface of the separator film 130. FIG. 3E shows a bonding area 130e formed in an inclined stripe pattern on the surface of the separator film 130. FIG. 3F shows a bonding area 130f formed in a grid pattern on the surface of the separator film 130. The bonding areas 130a through 130f illustrated in FIGS. 3A to 3F are an example only, and the bonding area may be formed in various other patterns.

A binding member 140 may be disposed at an end of the electrode structure 160. The end of the electrode structure 160 may be bound to the binding member 140. The binding member 140 may be provided by using, for example, an adhesive agent, or a tape doped with an adhesive agent, or other suitable methods to provide the binding member 140. As illustrated in FIG. 2, the binding member 140 binds, e.g., rigidly connects, an end of the first electrode plates 110 and 110', to which the separator film 130 is bonded, and an end of the second electrode plates 120 and 120'. FIG. 2 shows that the first electrode current collector 111 of the first electrode plates 110 and 110' and the second electrode current collector 121 of the second electrode plates 120 and 120' are bound using the binding member 140. In some embodiments, the first electrode active material layer 112 of the first electrode plates 110 and 110' and the second electrode active material layer 122 of the second electrode plates 120 and 120' may be bound by using the binding member 140. In some embodiments, the first electrode current collector 111 and the first electrode active material layer 112 of the first electrode plates 110 and 110' and the second electrode current collector 121 and the second electrode active material layer 122 of the second electrode plates 120 and 120' may be bound using the binding member 140.

In an embodiment in which the electrode structure 160 is not bound, when the electrode structure 160 is repeatedly bent, relative locations of individual layers of the electrode structure 160 may change, leading to misalignment. In this case, a reversible electrochemical reaction between the first electrode plates 110 and 110' and the second electrode plates 120 and 120' may decrease, and short circuit may occur between the first electrode plates 110 and 110' and the second electrode plates 120 and 120'. In the present embodiment, however, the end of the electrode structure 160 is bound to the binding member 140, and thus, even when the electrode assembly 100 is bent and deformed, the alignment of the first electrode plates 110 and 110', the separator film 130, and the second electrode plate 110 and 110' may be maintained to allow a reversible electrochemical reaction to occur.

Figure 4:
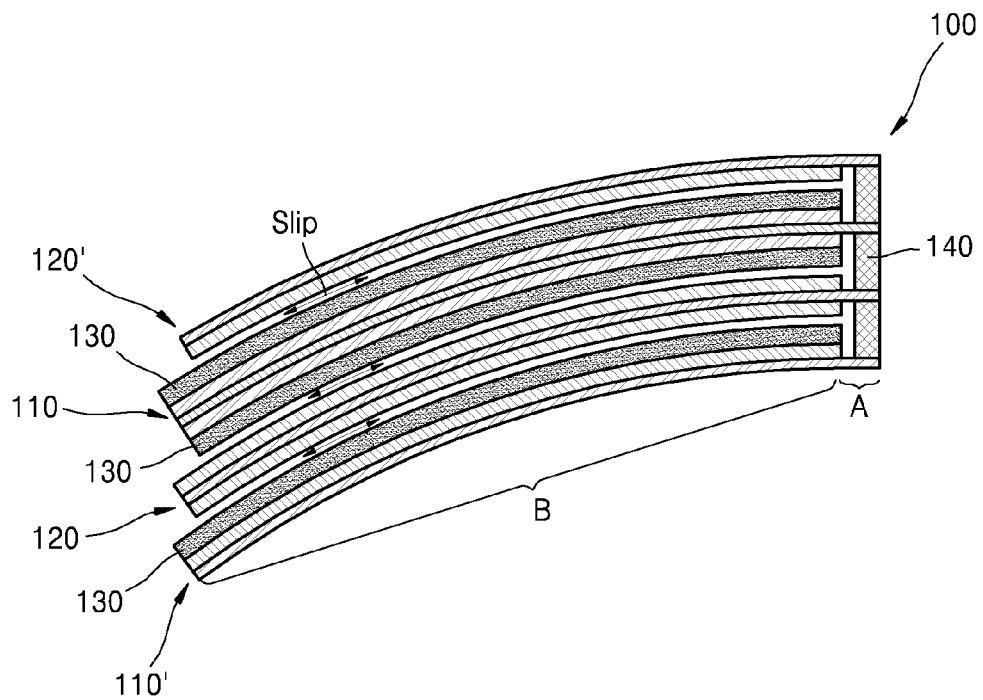
FIG. 4 is a schematic diagram which illustrates the electrode assembly of FIGS. 1 and 2 in a bent state.

FIG. 4 illustrates a schematic view of the electrode assembly 100 of FIGS. 1 and 2 when the electrode assembly is deformed into a bent state.

Referring to FIG. 4, when the electrode assembly 100 is bent and deformed from an un-bent state thereof, slippage may occur between the separator film 130 and the second electrode plates 120 and 120' (for example, the second electrode active material layer 122). Herein, since an end A of the electrode structure 160, which is proximate to the binding member 140, is bound to the binding member 140, a first portion of the electrode structure, which is proximate to the end A of the electrode structure 160 and is bound to the binding member 140, may experience less the slippage than a second portion B of the electrode structure 160, which is distal to the binding member 140. That is, an end of the electrode structure 160, which is distal to the binding member 140, may experience more the slippage than the end A of the electrode structure 160 which is proximate to and bound to the binding member 140. Accordingly, when the electrode assembly 100 is bent and deformed, layers of the electrode structure 160 which are proximate to the binding member 140 experience less relative-location change where slippage occurs in the end A of the electrode structure 160, which is bound to the binding member 140, than in the second portion B of the electrode structure 160, which is distal to the binding member 140.

Since the first electrode plates 110 and 110' are bonded to the separator film 130, even when the electrode assembly 100 is bent and deformed, the slippage may not occur between the first electrode plates 110 and 110' (for example, the first electrode active material layer 112). Accordingly, erosion, secession, or grinding of an active material layer, which may occur due to the slippage between the first electrode plates 110 and 110' and the separator film 130, may be substantially or effectively prevented. In the embodiment presented above, two first electrode plates 110 and 110' and two second electrode plates 120 and 120' are alternately disposed, e.g., stacked. However, the disclosed embodiments are not limited thereto. Any suitable number of the first electrode plates 110 and 110', second electrode plates 120 and 120', and separator film 130 may be used and may be, for example, be 2 to about 1000, or about 4 to about 500.

In the electrode assembly 100 according to the present embodiment, the end of the electrode structure 160 is bound to the binding member 140. Accordingly, even when the electrode assembly 100 is bent and deformed, the alignment of the first electrode plates 110 and 110', the separator film 130, and the second electrode plates 120 and 120' may be maintained to allow a reversible electrochemical reaction to occur. Accordingly, when the electrode assembly 100 is repeatedly bent, relative locations of layers of the electrode structure 160 may be maintained, and thus, a short circuit caused by the misalignment may be preventable, and even after the electrode assembly 100 is repeatedly bent, a reversible electrochemical reaction, such as charging and discharging, may be continuously performed.

Since the separator film 130 is bonded to the first electrode plates 110 and 110' so that the separator film 130 is integrally formed with, e.g., directly bonded to, the first electrode plates 110 and 110' to form a single body, the occurrence of the slippage between the first electrode plates 110 and 110' and the separator film 130 when the electrode assembly 100 is bent and deformed may be substantially or effectively prevented. Accordingly, erosion, secession, or grinding of an active material layer is prevented, and thus, durability and stability of the electrode assembly 100 may be improved. When the electrode assembly 100 is packaged together with an electrolyte and an external material, and an electrochemical device, for example, a lithium secondary battery, is manufactured.

Figure 5:
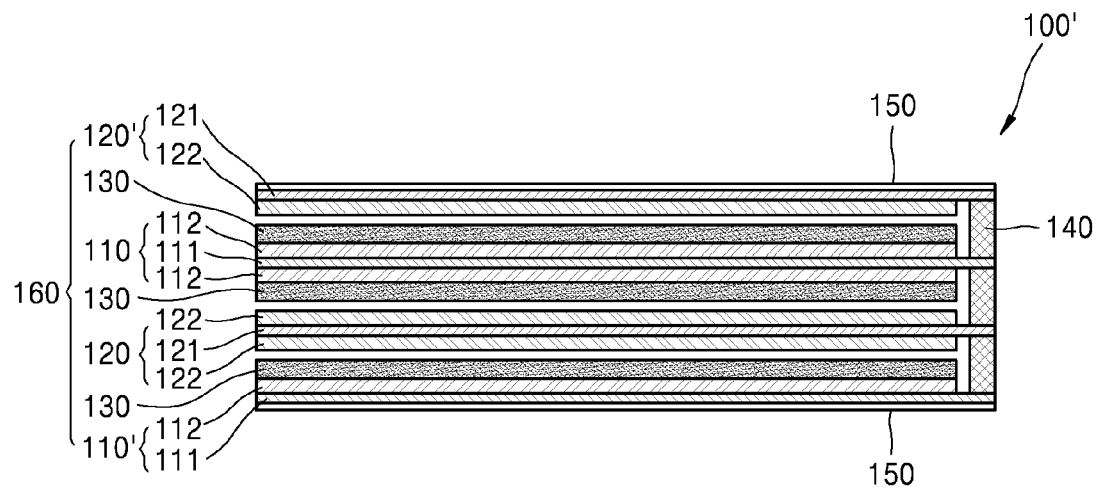
FIG. 5 is a cross-sectional view of another embodiment of an electrode assembly.

FIG. 5 is a cross-sectional view of an electrode assembly 100' according to another exemplary embodiment.

The electrode assembly 100' of FIG. 5 is the same as the electrode assembly 100 of FIG. 2, except that a protective layer 150 is disposed on an outer surface of the electrode structure 160. Referring to FIG. 5, the protective layer 150 is disposed on, e.g., formed on, the outer surface of the electrode structure 160 that includes the first electrode plates 110 and 110', the second electrode plates 120 and 120', and the separator film 130 disposed between the first electrode plates 110 and 110' and the second electrode plates 120 and 120'. The protective layer 150 protects the electrode structure 160 from physical impacts or chemical influence on the electrode structure 160. The protective layer 150 may include a material that has a selected degree of flexibility and stiffness, e.g., tensile modulus, so as to not to affect the bending of the electrode structure 160. The protective layer may have a tensile modulus (i.e., Young's modulus) of about 0.001 to about 300 GPa, or about 0.01 to about 100 GPa, or about 0.05 to about 10 GPa.

A bending stiffness of the protective layer 150 may be greater than an average bending stiffness of layers constituting the electrode structure 160. For example, a bending stiffness of the protective layer 150 may be about 1.5 times or more greater than an average bending stiffness of layers constituting the electrode structure 160. In some embodiments, a thickness of the protective layer 150 may be in a range of about 15 micrometers (μm) to about 1 millimeter (mm), or about 30 μm to about 0.5 mm, or about 60 μm to about 250 μm, and a tensile modulus of elasticity, i.e., Young's modulus, of the protective layer 150 may be in a range of about 0.5 to about 300 GPa, or about 0.001 to about 5 GPa, or about 0.01 to about 1 GPa, or about 0.05 to about 0.5 GPa. However, the disclosed embodiments are not limited thereto. The protective layer 150 may be, for example, a polymer film, a film including a laminated polymer film layer, a metal foil, or a composite film including carbon.

Figure 6:
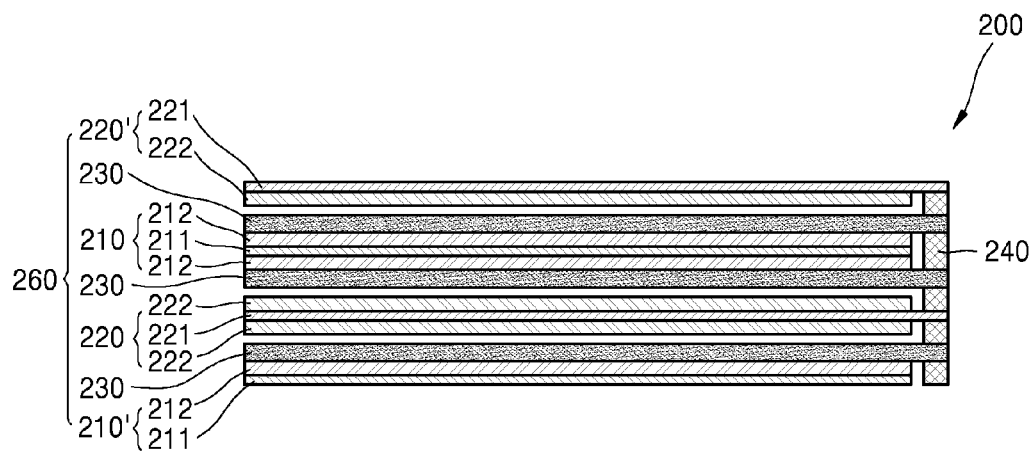
FIG. 6 is a cross-sectional view of yet another embodiment of an electrode assembly.

FIG. 6 is a cross-sectional view of an electrode assembly 200 according to another embodiment. The present embodiment will be described based on differences from the embodiment described above.

Referring to FIG. 6, the electrode assembly 200 includes an electrode structure 260 and a binding member 240 that binds, e.g., rigidly connects, an end of the electrode structure 260. The electrode structure 260 includes a first inner electrode plate 210 and a first outer electrode plate 210', hereinafter collectively "first electrode plates 210 and 210', and a second electrode inner plate 220 and a second outer electrode plate 220', hereinafter collectively "second electrode plates 220 and 220', which are alternately disposed, e.g., stacked, and a separator film 230, which is disposed between the first electrode plates 210 and 210' and the second electrode plates 220 and 220'. Herein, a surface of the separator film 230 is bonded to the respective adjacent first electrode plate, e.g., first electrode plates 210 and 210'. The first electrode plates 210 and 210' may be cathode plates and the second electrode plates 220 and 220' may be anode plates, and in some embodiments, the first electrode plates 210 and 210' may be anode plates and the second electrode plates 220 and 220' may be cathode plates. Each of the first electrode plates 210 and 210' may include a first electrode current collector 211 and a first electrode active material layer 212 disposed on, e.g., formed on, a surface of the first electrode current collector 211. Each of the second electrode plates 220 and 220' may include a second electrode current collector 221 and a second electrode active material layer 222 disposed on, e.g., formed on, a surface of the second electrode current collector 221.

The surface of the separator film 230 may be bonded to the first electrode plates 210 and 210'. The bonding of the separator film 230 and the first electrode plates 210 and 210' may be performed using, for example, an adhesive layer or directly bonding the separator film 230 to the respective adjacent first electrode plate. The surface of the separator film 230 may have a bonding area where the first electrode plates 210 and 210' are actually bonded to the respective adjacent separator film 230, as in the embodiments illustrated in FIGS. 3A to 3F. The bonding area may occupy the entire surface or a portion of the surface of the separator film 230.

The binding member 240 is disposed on the end of the electrode structure 260, and the binding member 240 binds, e.g., rigidly connects, the end of the electrode structure 260. In the present embodiment, the end of the separator film 230 and ends of the second electrode plates 220 and 220' are bound to the binding member 240. As is further disclosed above, since the binding member 240 binds, e.g., rigidly connects, the end of the electrode structure 260, even when the electrode assembly 200 is bent and deformed, the alignment for a reversible electrochemical reaction is maintained. Although not illustrated in this drawing, a protective layer (not shown) may be further disposed on an outer surface of the electrode structure 200 to protect the electrode structure 260.

Figure 7:
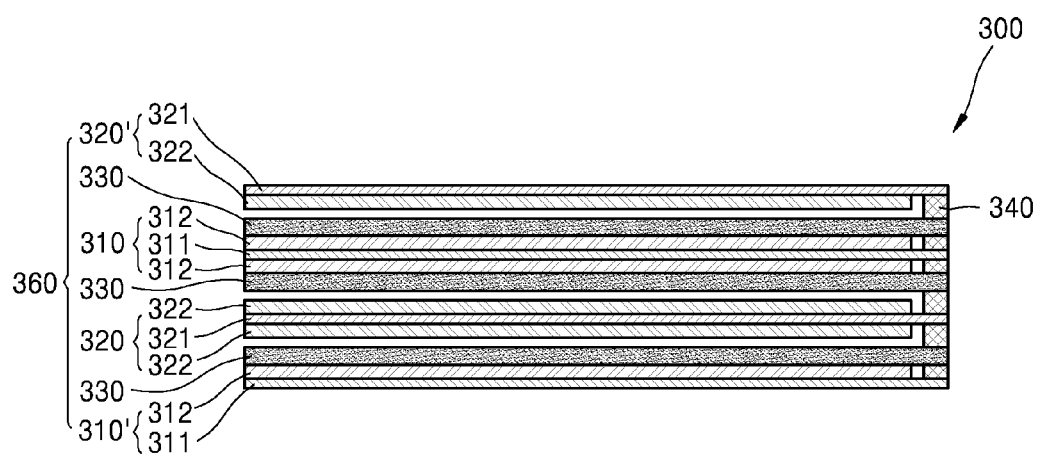
FIG. 7 is a cross-sectional view of yet another embodiment of an electrode assembly.

FIG. 7 is a cross-sectional view of an electrode assembly 300 according to another embodiment. The present embodiment will be described based on differences from the embodiments described above.

Referring to FIG. 7, the electrode assembly 300 includes an electrode structure 360 and a binding member 340 that binds, e.g., rigidly connects, an end of the electrode structure 360. The electrode structure 360 includes a first electrode inner plate 310 and a first electrode outer plate 310', hereinafter collectively "first electrode plates," and a second inner electrode plate 320 and a second outer electrode plates 320', hereinafter collectively "second outer electrode plates," which are alternately stacked, and a separator film 330 disposed between the first electrode plates 310 and 310' and the second electrode plates 320 and 320'. Herein, a surface of the separator film 330 is bonded to the respective adjacent first electrode plates 310 and 310'. The first electrode plates 310 and 310' may be cathode plates and the second electrode plates 320 and 320' may be anode plates, and in some embodiments, the first electrode plates 310 and 310' may be anode plates and the second electrode plates 320 and 320' may be cathode plates. Each of the first electrode plates 310 and 310' may include a first electrode current collector 311 and a first electrode active material layer 312 disposed on, e.g., formed on, a surface of the first electrode current collector 311. Each of the second electrode plates 320 and 320' may include a second electrode current collector 321 and a second electrode active material layer 322 disposed on, e.g., formed on, a surface of the second electrode current collector 321.

A surface of the separator film 330 is bonded to the respective adjacent first electrode plate, e.g., first electrode plates 310 and 310'. The surface of the separator film 330 may have a bonding area where the first electrode plates 310 and 310' are directly bonded to the separator film 330, as in the embodiments illustrated in FIGS. 3A to 3F. The bonding area may occupy the entire surface or a portion of the surface of the separator film 330.

The binding member 340 is disposed on, e.g., located on, the end of the electrode structure 360, and the binding member 340 binds, e.g., rigidly connects, the end of the electrode structure 360. In the present embodiment, an end of the separator film 330, ends of the first electrode plates 310 and 310', and ends of the second electrode plates 320 and 320' are bound to the binding member 340. As is further disclosed above, since the binding member 340 binds, e.g., rigidly connects, the end of the electrode structure 360, even when the electrode assembly 300 is bent and deformed, the alignment for a reversible electrochemical reaction is maintained. Although not illustrated in this drawing, a protective layer (not shown) may be further disposed on an outer surface of the electrode structure 360 to protect the electrode structure 360.

Figure 8:
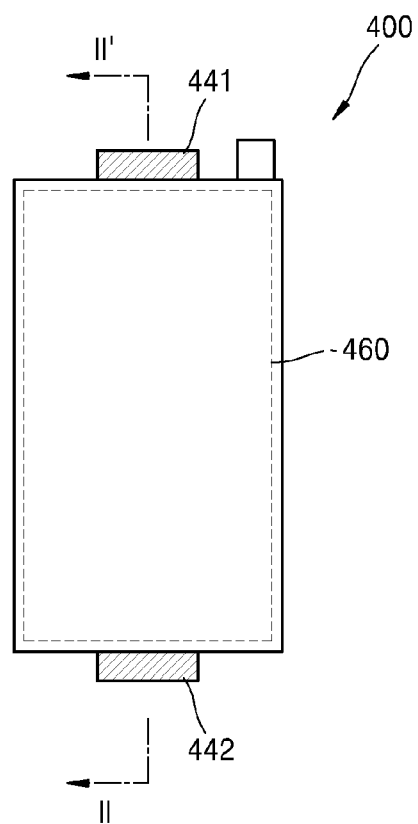
FIG. 8 is a plan view of another embodiment of an electrode assembly.
Figure 9:
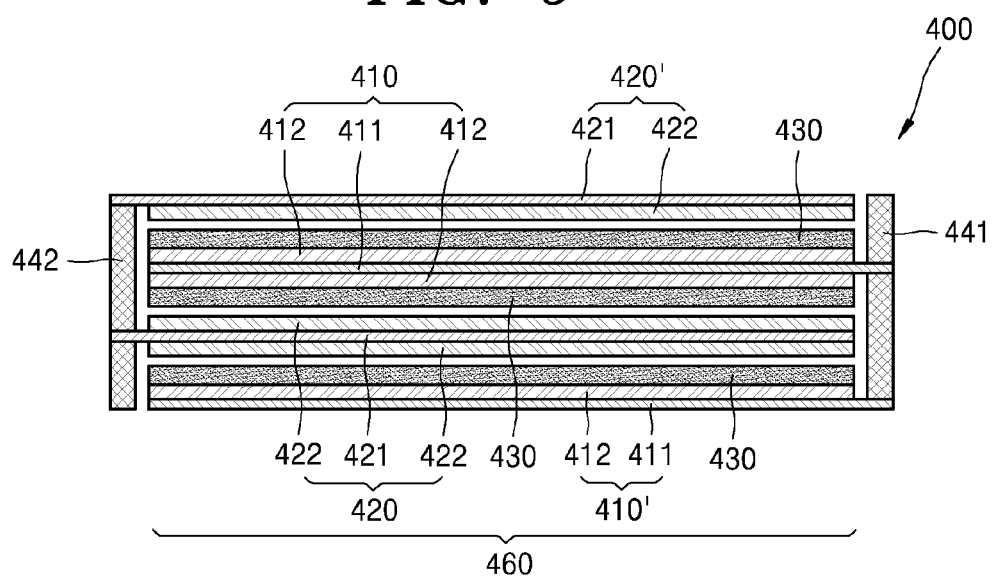
FIG. 9 is a cross-sectional view taken along line II-II' of FIG. 8.

FIG. 8 is a plan view of an electrode assembly 400 according to another exemplary embodiment. FIG. 9 is a cross-sectional view taken along line II-II' of FIG. 8. The present embodiment will be described based on differences from the embodiments described above.

Referring to FIGS. 8 and 9, the electrode assembly 400 includes an electrode structure 460 and a binding member that binds facing ends of the electrode structure 460. The electrode structure 460 includes a first inner electrode plate 410 and a first outer electrode plate 410', hereinafter collectively "first electrode plates," and a second inner electrode plate 420 and a second inner electrode plate 420', hereinafter collectively "second electrode plates," which are alternately disposed, e.g., stacked, and a separator film 430 disposed between a first electrode plate, e.g., first electrode plates 410 or 410', and a the second electrode plate, e.g., second electrode plates 420 or 420'. Herein, the separator film 430 is bonded to the first electrode plates 410 and 410'.

The first electrode plates 410 and 410' may be cathode plates and the second electrode plates 420 and 420' may be anode plates, and in some embodiments, the first electrode plates 410 and 410' may be anode plates and the second electrode plates 420 and 420' may be cathode plates. Each of the first electrode plates 410 and 410' may include a first electrode current collector 411 and a first electrode active material layer 412 disposed on, e.g., formed on, a surface of the first electrode current collector 411. Each of the second electrode plates 420 and 420' may include a second electrode current collector 421 and a second electrode active material layer 422 disposed on, e.g., formed on, a surface of the second electrode current collector 421. For example, when the first electrode plates 410 and 410' is a cathode plate and the second electrode plates 420 and 420' is an anode plate, the first electrode current collector 411 may be a cathode current collector and the first electrode active material layer 412 may be a cathode active material layer. In this case, the second electrode current collector 421 may be an anode current collector and the second electrode active material layer 422 may be an anode active material layer.

The separator film 430 is disposed between the first electrode plates 410 and 410' and the second electrode plates 420 and 420'. Herein, a surface of the separator film 430 is bonded to the first electrode plates 410 and 410'. The bonding of the separator film 430 and the first electrode plates 410 and 410' may be performed by, for example, using an adhesive layer or a direct bonding. The surface of the separator film 430 may have a bonding area where the first electrode plates 410 and 410' are actually bonded to the separator film 430, as in the embodiments illustrated in FIGS. 3A to 3F. The bonding area may occupy the entire surface or a portion of the surface of the separator film 430.

A binding member may be disposed at facing ends of the electrode structure 460. The binding member includes a first binding member 441 binding an end of the electrode structure 460 and the second binding member 442 binding the other end of the electrode structure 460. The first binding member 441 binds, e.g., rigidly connects, ends of the first electrode plates 410 and 410' to which the separator film 430 is bonded, and the second binding member 442 binds ends of the second electrode plates 420 and 420' which are located opposite to the ends of the first electrode plate 410 and 410'. FIG. 9 illustrates that the first binding member 441 may bind the first electrode current collector 411 of the first electrode plates 410 and 410', and the second binding member 442 may bind the second electrode current collector 421 of the second electrode plates 420 and 420'. However, the disclosed embodiments are not limited thereto. In some embodiments, the first binding member 441 binds at least one selected from the first electrode current collector 411 and the first electrode active material layer 412 of each of the first electrode plates 410 and 410', and the second binding member 442 binds at least one selected from the second electrode current collector 421 and the second electrode active material layer 422 of each of the second electrode plates 420 and 420'. Although not illustrated in this drawing, a protective layer (not shown) may be further disposed on an outer surface of the electrode structure 460 to protect the electrode structure 460.

Figure 10:
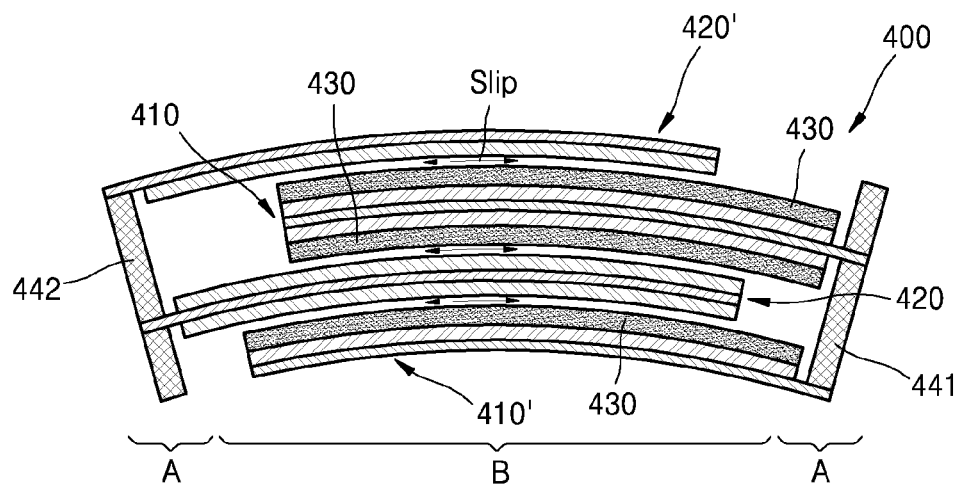
FIG. 10 illustrates a cross-sectional view of the electrode assembly of FIGS. 8 and 9 when the electrode assembly is in a bent state.

FIG. 10 illustrates a cross-sectional view of the electrode assembly 400 of FIGS. 8 and 9 when the electrode assembly 400 is deformed into a bent state.

Referring to FIG. 10, when the electrode assembly 400 is bent and deformed from an un-bent state thereof, slippage may occur between the separator film 430 and the second electrode plates 420 and 420' (for example, the second electrode active material layer 422). Herein, since the portions of the of the electrode structure 460 proximate to ends A of the electrode structure 460 are bound to the first and second binding members 441 and 442, slippage occurs less in the portions proximate to ends A of the electrode structure 460, which are bound to the first and second binding members 441 and 442, than in the central portion B of the electrode structure 460, which is not bound. Accordingly, layers constituting the electrode structure 460 may experience less relative-location changes where slippage occurs near or in the ends A of the electrode structure 460, which is bound to the first and second binding members 441 and 442, than in the central portion B of the electrode structure 460, which is not bound to the first and second binding members 441 and 442. As described above, since the ends A of the electrode structure 460 are bound to the first and second binding members 441 and 442, even when the electrode assembly 400 is bent and deformed, the alignment for a reversible electrochemical reaction may be maintained.

Since the first electrode plates 410 and 410' are bonded to the separator film 430, even when the electrode assembly 400 is bent and deformed, the slippage may not occur between the first electrode plates 410 and 410' and the separator film 430. Accordingly, erosion, secession, or grinding of an active material layer, which may occur due to the slippage between the first electrode plates 410 and 410' and the separator film 430, may be prevented.

Figure 11:
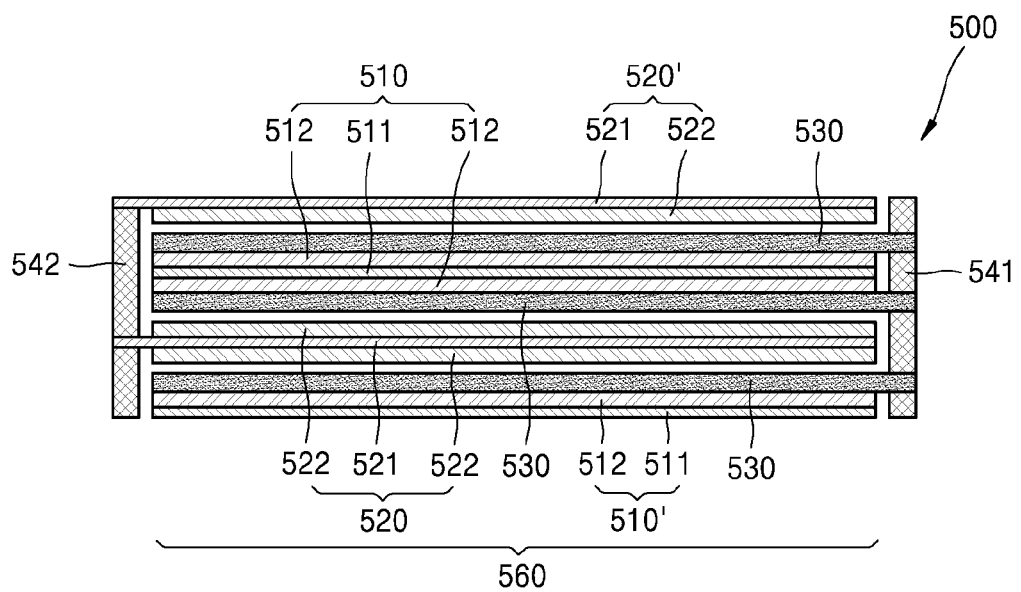
FIG. 11 is a cross-sectional view of yet another embodiment of an electrode assembly.

FIG. 11 is a cross-sectional view of an electrode assembly 500 according to another embodiment. The present embodiment will be described based on differences from the embodiments disclosed above.

Referring to FIG. 11, the electrode assembly 500 includes an electrode structure 560 and a binding member that binds ends of the electrode structure 560. The electrode structure 560 includes a first inner electrode plate 510 and a first outer electrode plate 510', collectively "first electrode plates," and a second inner electrode plate 520 and a second outer electrode plate 520', hereinafter collectively "second electrode plates," which are alternately disposed, e.g., stacked, and at least one separator film 530 disposed between the first electrode plates 510 and 510' and the second electrode plates 520 and 520'. Each of the first electrode plates 510 and 510' may include a first electrode current collector 511 and a first electrode active material layer 512 disposed on, e.g., formed on, a surface of the first electrode current collector 511. Each of the second electrode plates 520 and 520' may include a second electrode current collector 521 and a second electrode active material layer 522 disposed on, e.g., formed on, a surface of the second electrode current collector 521.

The separator film 530 is disposed between the first electrode plates 510 and 510' and the second electrode plates 520 and 520'. Herein, a surface of the separator film 530 is bonded to the respective adjacent first electrode plates 510 and 510'. The surface of the separator film 530 may have a bonding area where the first electrode plates 510 and 510' are directly bonded to the separator film 530, as in the embodiments illustrated in FIGS. 3A to 3F. The bonding area may occupy the entire surface or a portion of the surface of the separator film 530.

A binding member may be disposed at facing ends of the electrode structure 560. The binding member includes a first binding member 541 that binds, e.g., rigidly connects, an end of the electrode structure 560 and the second binding member 542 that binds an opposite end of the electrode structure 560. In the present embodiment, the first binding member 541 binds an end of the separator film 530, and the second binding member 542 binds an end of the second electrode plates 520 and 520', which is located opposite to the end of the separator film 530. Although not illustrated in this drawing, a protective layer (not shown) may be further disposed on an outer surface of the electrode structure 560 to protect the electrode structure 560.

Figure 12:
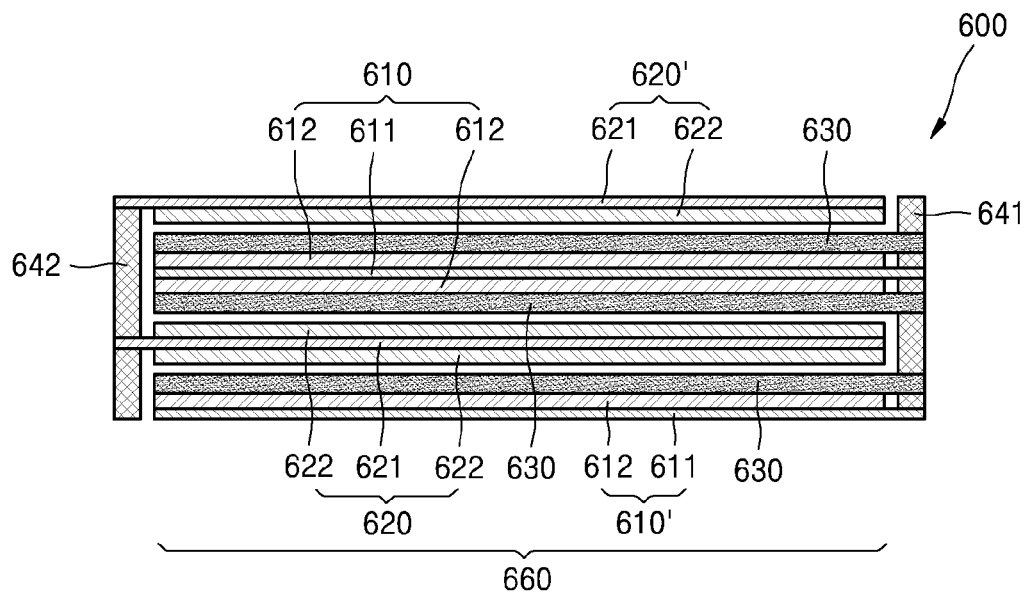
FIG. 12 is a cross-sectional view of yet another embodiment of an electrode assembly.

FIG. 12 is a cross-sectional view of an electrode assembly 600 according to another embodiment. The present embodiment will be described based on differences from the embodiments disclosed above.

Referring to FIG. 12, the electrode assembly 600 includes an electrode structure 660 and a binding member that binds, e.g., rigidly connects, ends of the electrode structure 660. The electrode structure 660 includes a first inner electrode plate 610 and a first outer electrode plate 610', collectively "first electrode plates," and a second inner electrode plate 620 and second outer electrode plate 620', collectively second electrode plates, which are alternately disposed, e.g., stacked, and a separator film 630, which is disposed between the respective adjacent first electrode plates 610 and 610' and the second electrode plates 620 and 620'. Each of the first electrode plates 610 and 610' may include a first electrode current collector 611 and a first electrode active material layer 612 disposed on, e.g., formed on, a surface of the first electrode current collector 611. Each of the second electrode plates 620 and 620' may include a second electrode current collector 621 and a second electrode active material layer 622 disposed on, e.g., formed on, a surface of the second electrode current collector 621.

The separator film 630 is disposed between the first electrode plates 610 and 610' and the respective adjacent second electrode plates 620 and 620'. Herein, a surface of the separator film 630 is bonded to the respective adjacent first electrode plates 610 and 610'. The surface of the separator film 630 may have a bonding area where the first electrode plates 610 and 610' are directly bonded to the separator film 630, as in the embodiments illustrated in FIGS. 3A to 3F. The bonding area may occupy the entire surface or a portion of the surface of the separator film 630.

A binding member may be disposed at facing ends of the electrode structure 660. The binding member includes a first binding member 641 binding an end of the electrode structure 660 and the second binding member 642 binding the other end of the electrode structure 660. In the present embodiment, the first binding member 641 binds an end of the first electrode plates 610 and 610' and an end of the separator film 630, and the second binding member 642 binds an end of the second electrode plates 620 and 620' which is located opposite to the end of the separator film 630. Although not illustrated in this drawing, a protective layer (not shown) may be further disposed on an outer surface of the electrode structure 660 to protect the electrode structure 660.

Figure 13:
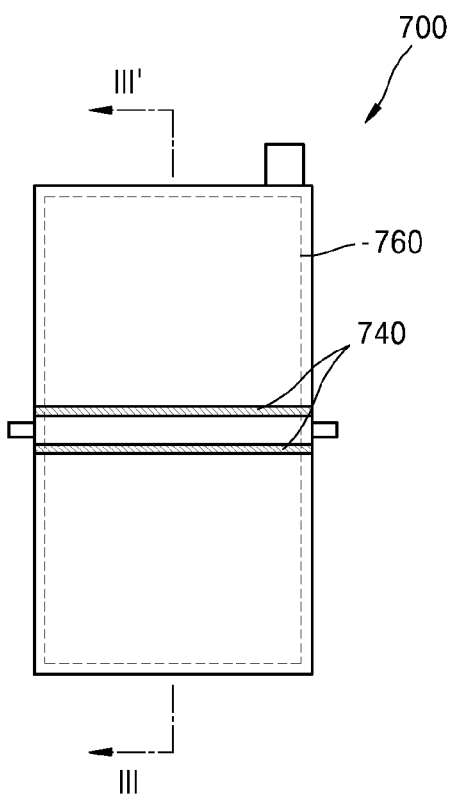
FIG. 13 is a plan view of another embodiment of an electrode assembly.
Figure 14:
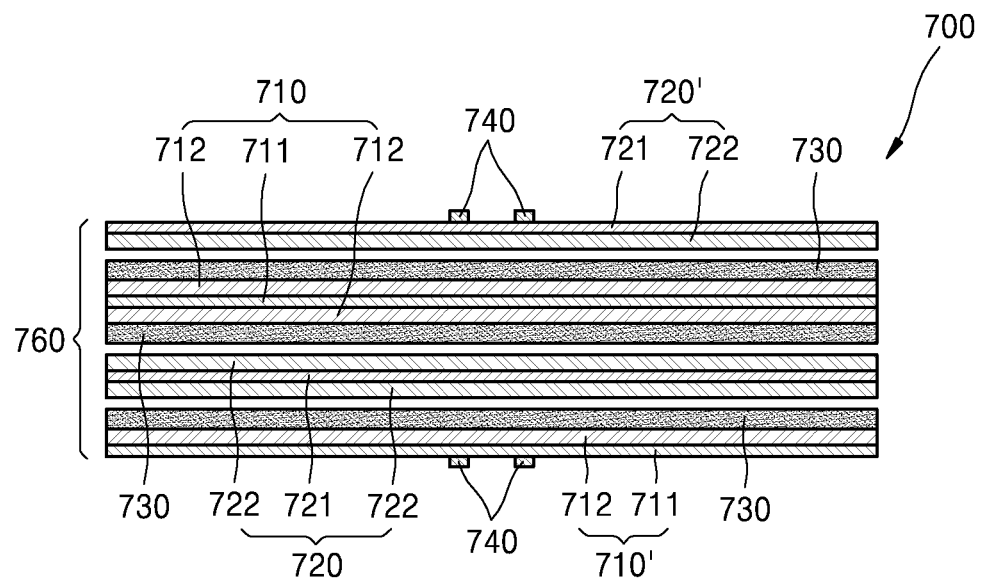
FIG. 14 is a cross-sectional view taken along line III-III' of FIG. 13.

FIG. 13 is a plan view of an electrode assembly 700 according to another exemplary embodiment. FIG. 14 is a cross-sectional view taken along line III-III' of FIG. 13. The present embodiment will be described based on differences from the embodiments disclosed above.

Referring to FIGS. 13 and 14, the electrode assembly 700 includes an electrode structure 760 and a binding member 740 that binds, e.g., rigidly connects, a central portion of the electrode structure 760. The electrode structure 760 includes a first inner electrode plate 710 and a first outer electrode plate 710', collectively first electrode plates, and a second inner electrode plate 720 and a second outer electrode plate 720', collectively second electrode plates, which are alternately disposed, e.g., stacked, and at least one separator film 730 disposed between the first electrode plates 710 and 710' and the respective adjacent second electrode plates 720 and 720'. Herein, the separator film 730 is bonded to the first electrode plates 710 and 710'.

The first electrode plates 710 and 710' may be cathode plates and the second electrode plates 720 and 720' may be anode plates, and in some embodiments, the first electrode plates 710 and 710' may be anode plates and the second electrode plates 720 and 720' may be cathode plates. Each of the first electrode plates 710 and 710' may include a first electrode current collector 711 and a first electrode active material layer 712 formed on the first electrode current collector 711. Each of the second electrode plates 720 and 720' may include a second electrode current collector 721 and a second electrode active material layer 722 formed on a surface of the second electrode current collector 721. For example, when the first electrode plates 710 and 710' is a cathode plate and the second electrode plates 720 and 720' is an anode plate, the first electrode current collector 711 may be a cathode current collector and the first electrode active material layer 712 may be a cathode active material layer. In this case, the second electrode current collector 721 may be an anode current collector and the second electrode active material layer 722 may be an anode active material layer.

The separator film 730 is disposed between the first electrode plates 710 and 710' and the respective adjacent second electrode plates 720 and 720'. Herein, a surface of the separator film 730 is bonded to the first electrode plates 710 and 710'. The bonding of the separator film 730 and the first electrode plates 710 and 710' may be performed using, for example, an adhesive layer or by directly bonding the separator film to the electrode plate. The surface of the separator film 730 may have a bonding area where the first electrode plates 710 and 710' are directly bonded to the separator film 730, as in the embodiments illustrated in FIGS. 3A to 3F. The bonding area may occupy the entire surface or a portion of the surface of the separator film 730.

The binding member 740 may be disposed at a central portion of the electrode structure 760. The binding member 740 binds, e.g., rigidly connects, the central portion of the electrode structure 760. Although not illustrated in this drawing, a protective layer (not shown) may be further disposed on an outer surface of the electrode structure 760 to protect the electrode structure 760.

Figure 15:
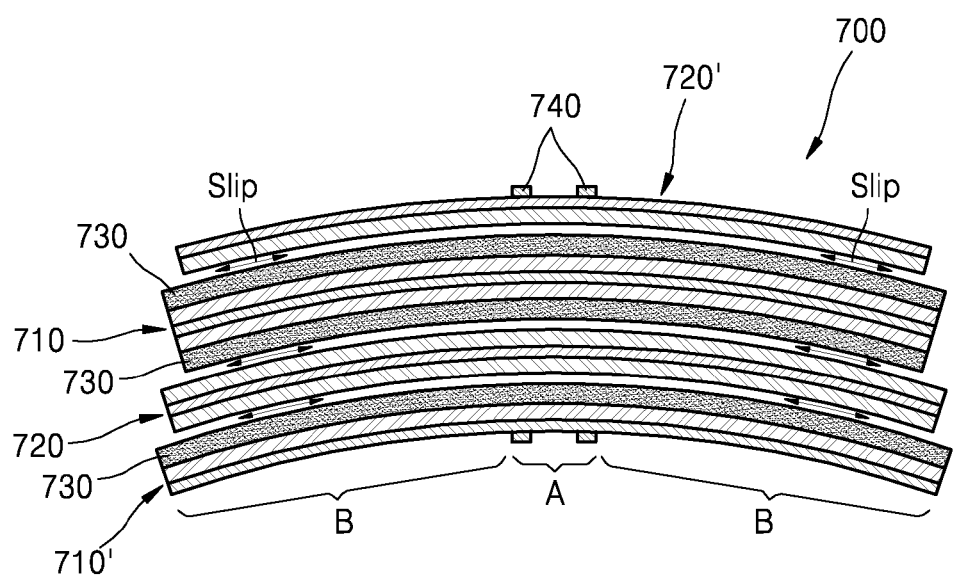
FIG. 15 illustrates a cross-sectional view of the electrode assembly of FIGS. 13 and 14 when the electrode assembly is in a bent state.

FIG. 15 illustrates a cross-sectional view of the electrode assembly 700 of FIGS. 13 and 14 when the electrode assembly is deformed into a bent state.

Referring to FIG. 15, when the electrode assembly 700 is bent and deformed from an un-bent state thereof, slippage may occur between the separator film 730 and the second electrode plates 720 and 720' (for example, the second electrode active material layer 722). Herein, since a central portion A of the electrode structure 760 is bound to the binding member 740, slippage occurs less in the central portion A of the electrode structure 760 bound to the binding member 740 than in a portion B (for example, facing ends) of the electrode structure 760 which is not bound. Accordingly, layers constituting the electrode structure 760 may experience less relative-location changes where slippage occurs in the central portion A of the electrode structure 760 which is bound to the binding member 740 than in the portion B of the electrode structure 760 which is not bound to the binding member 740. As is further disclosed above, since the central portion A of the binding member 760 are bound to the first and second binding members 741 and 742, even when the electrode assembly 700 is bent and deformed, the alignment for a reversible electrochemical reaction may be maintained.

Since the first electrode plates 710 and 710' are bonded to the separator film 730, even when the electrode assembly 700 is bent and deformed, the slippage may not occur between the first electrode plates 710 and 710' and the separator film 730. Accordingly, secession or grinding of an active material layer, which may occur due to the slippage between the first electrode plates 710 and 710' and the separator film 730, may be prevented.

In the above-described embodiments, a portion of an electrode structure is bound to a binding member, and thus, even when an electrode assembly is repeatedly bent, relative locations of layers constituting the electrode structure may be maintained. Accordingly, short circuit due to misalignment may be prevented, and even after the repeated bending of the electrode assembly, a reversible electrochemical reaction, for example, charging and discharging, may be continuously performed. Also, since a separator film is bonded to a first electrode plate so that the separator film and the first electrode plate constitute one body, when the electrode assembly is bent, slippage between the first electrode plate and the separator film may be prevented from occurring. Accordingly, erosion, secession, or grinding of an active material layer is prevented, and thus, durability and stability of the electrode assembly may be improved.

What is claimed is:

1. An electrode assembly comprising:
an electrode structure comprising
a first electrode plate and a second electrode plate which are alternately disposed, and
a separator film that is disposed between the first electrode plate and the second electrode plate, wherein one surface of the separator film is bonded to the first electrode plate but the other surface of the separator film is not bonded to the second electrode plate; and
a binding member, which rigidly connects a first portion of the second electrode plate that is proximate to the binding member and at least one selected from a first portion of the first electrode plate that is proximate to the binding member and a first portion of the separator film that is proximate to the binding member.

2. The electrode assembly of claim 1, wherein the first and second electrode plates have a tensile modulus of less than 300 gigapascals.

3. The electrode assembly of claim 1, wherein each of the first and second electrode plates comprises an electrode current collector and an electrode active material layer disposed on at least a surface of the electrode current collector.

4. The electrode assembly of claim 3, wherein the first electrode plate is a cathode plate, and the second electrode plate is an anode plate.

5. The electrode assembly of claim 3, wherein the first electrode plate is an anode plate, and the second electrode plate is a cathode plate.

6. The electrode assembly of claim 1, wherein the first electrode plate is bonded to the separator film by an adhesive layer which is between the first electrode plate and the separator film, or wherein the first electrode plate is directly bonded to the separator film.

7. The electrode assembly of claim 1, wherein at least a portion of the surface of the separator film contacts the first electrode plate.

8. The electrode assembly of claim 1, wherein, in a bent state of the electrode assembly relative to an un-bent state thereof, a relative-location change of layers of the electrode structure in a first portion, which is proximate to the binding member, is less than a relative-location change of a second portion of the electrode structure that is distal to the binding member.

9. The electrode assembly of claim 1, wherein the binding member rigidly connects an end of the electrode structure.

10. The electrode assembly of claim 9, wherein the binding member rigidly connects the second electrode plate and at least one selected from the first electrode plate and the separator film.

11. The electrode assembly of claim 1, wherein the binding member comprises a first binding member, which binds a first end of the electrode structure, and a second binding member, which rigidly connects a second opposite end of the electrode structure.

12. The electrode assembly of claim 11, wherein the first binding member rigidly connects at least one selected from the first electrode plate and the separator film, and the second binding member rigidly connects the second electrode plate.

13. The electrode assembly of claim 1, wherein the binding member rigidly connects a central portion of the electrode structure.

14. The electrode assembly of claim 1, further comprising a protective layer disposed on an outer surface of the electrode structure.

15. The electrode assembly of claim 14, wherein a bending stiffness of the protective layer is greater than an average bending stiffness of each of the first and second electrode plates and the separator film of the electrode structure.

16. An electrochemical device comprising:
an electrode assembly, wherein the electrode assembly comprises an electrode structure comprising
a first electrode plate and a second electrode plate which are alternately disposed,
a separator film that is disposed between the first electrode plate and the second electrode plate, and
a binding member which rigidly connects a first portion of the second electrode plate that is proximate to the binding member and at least one selected from a first portion of the first electrode plate that is proximate to the binding member and a first portion of the separator film that is proximate to the binding member, wherein one surface of the separator film is bonded to the first electrode plate but the other surface of the separator film is not bonded to the second electrode plate; and
an electrolyte disposed in the electrode structure.

17. The electrochemical device of claim 16, wherein the binding member rigidly connects an end, opposite ends, or a central portion of the electrode structure.

18. The electrochemical device of claim 16, wherein at least a portion of the surface of the separator film contacts the first electrode plate.

19. The electrochemical device of claim 16, further comprising a protective layer disposed on an outer surface of the electrode structure.

20. The electrode assembly of claim 1, wherein the electrode structure comprises 2 to about 1000 of each of the first electrode plate, the second electrode plate, and the separator film.

* * * * *